UNITED STATES PATENT OFFICE.

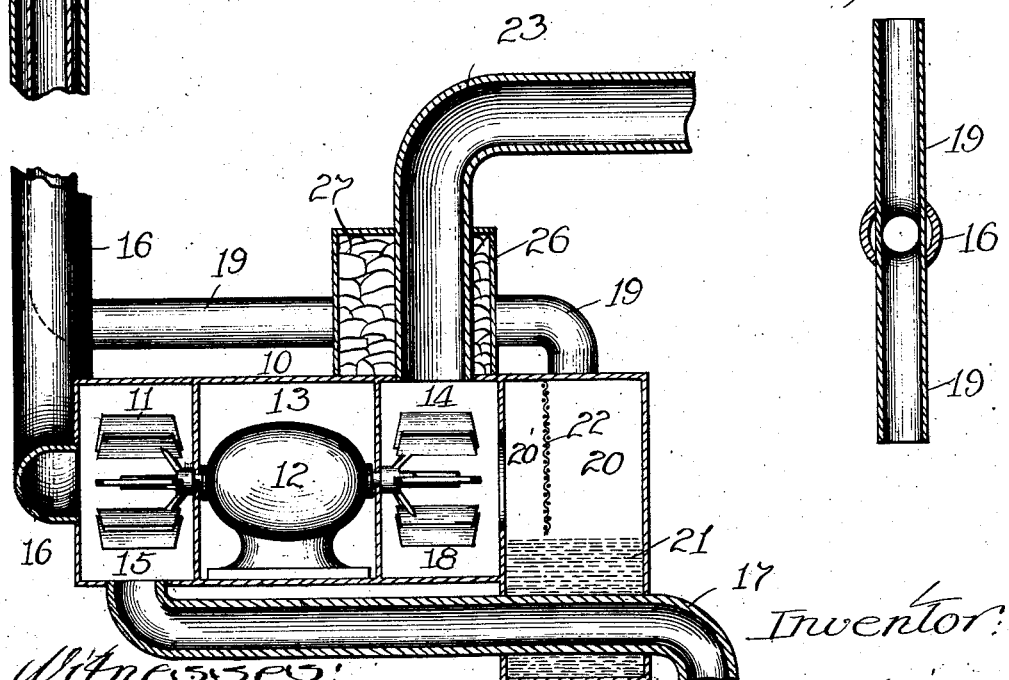

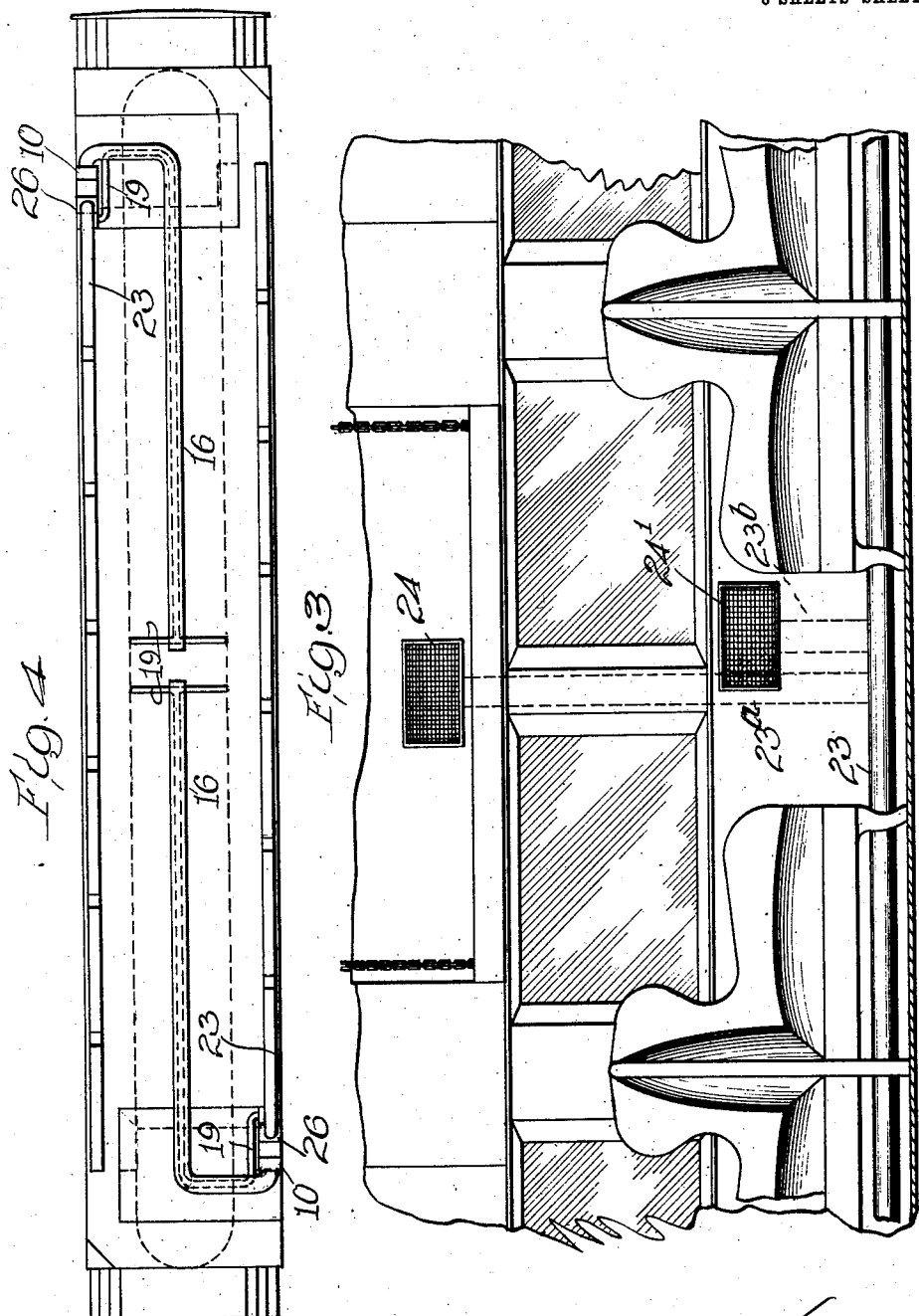

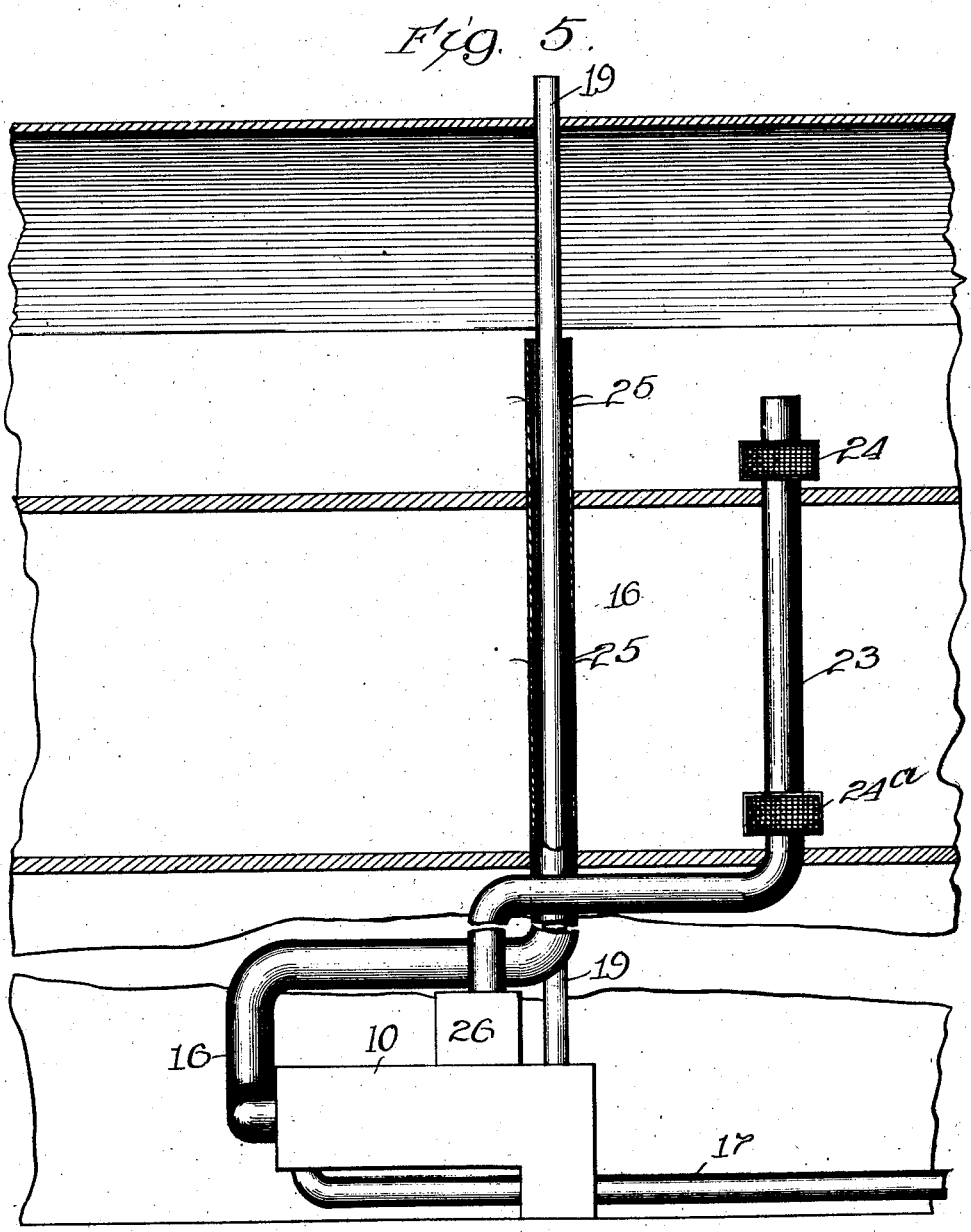

FRANK P. MIES, OF CHICAGO, ILLINOIS.

AIR-TEMPERING DEVICE.

1,027,141. Specification of Letters Patent. Patented May 21, 1912.

Application filed May 16, 1910. Serial No. 561,618.

*To all whom it may concern:*

Be it known that I, FRANK P. MIES, a citizen of the United States, residing at Chicago, in the county of Cook and State of Illinois, have invented certain new and useful Improvements in Air-Tempering Devices, of which the following is a specification.

My invention relates to improvements in apparatus for purifying and tempering air and distributing the same in apartments, railway coaches, street cars, and the like.

One of the objects of my invention is to provide a system wherewith to supply properly purified and tempered air to be distributed to apartments, and whereby vitiated impure air may be taken therefrom in proportionately the same extent as the air is admitted thereto.

My invention consists further in the novel operation more fully described hereinafter, and shown in the accompanying drawings.

In said drawings, Figure 1 is an elevation of the apparatus, partly in section; Fig. 2 is a plan view of the same with parts broken away; Fig. 3 is a broken-away section of a sleeping car, showing the registers at points of distribution with reference to the berths of the car; Fig. 4 is a plan view of the car on a reduced scale; Fig. 5 is a plan view showing how the apparatus can be applied to an ordinary railway car apartment; and Fig. 6 is a cross-sectional view taken on line 6—6 of Fig. 1, showing the pipe for conducting the fresh air surrounded by the pipe for conducting the warmer, foul, or vitiated air.

In all of the views, the same reference characters indicate similar parts.

The apparatus consists generally in the casing, 10, provided with a series of compartments or chambers. The compartment 11 contains the fan connected to one end of the shaft of the motor, 12, which itself is contained in the compartment 13. The other end of the casing contains a fan compartment, 14. The fan 15 draws air through the foul air pipe, 16, and projects it through the foul air pipe 17, without the apartment. The fan 18 draws fresh air through the fresh air intake pipe, 19, which is preferably contained within the foul air pipe, 16. The incoming air through the pipe 19 passes into the chamber, 20, containing water 21. A porous diaphragm, 22, of such material as cloth, divides the chamber or compartment 20 into two compartments, 20 and 20', so that the air coming into the compartment, 20, must pass through the diaphragm, 22, which is preferably dampened by water 21, into the eye of the fan. The dust or material particles held in suspension in the incoming air, through the pipe 19, lodge against the porous diaphragm 22, and is thereby screened out, and the air thus purified. A distributing pipe, 23, is a means for conducting the purified air to the various points of utilization within the several compartments. In Fig. 3, I have shown this pipe located near the floor of a sleeping car. The pipe has lateral branches, 23ª and 23ᵇ, which terminate in controllable registers, 24 and 24', respectively. The vitiated or foul air is taken out of the car by means of the pipe 16, located near the roof thereof. The foul and warm air entering the openings 25 and passing through the pipe 16, contains considerable heat, and for this reason the pure air pipe is arranged within the foul air pipe, so that the heat of the foul air may be given up to the incoming pure air, and thereby the incoming pure air will be tempered, or have its chill removed before it reaches the means by which it is to be subsequently heated before being distributed in the car. Any ordinary means for heating the air may be employed in connection with the system. After the foul air has passed through the pipe, 16, and through the casing of the fan, 15, it still contains some heat, and I therefore pass it through the chamber containing the water 21, so that the water may be heated to some extent by the heat remaining in the foul air before it is ejected from the apartment, thereby conserving all of the heat to a useful purpose. The temperature of the water, 21, being raised by this means, the air through the pipe, 19, will be somewhat warmed by it before reaching the registers, 24—24'.

In very hot weather, when it is desirable to cool the air before distributing it to the various compartments or sleeping berths of a car, I provide a casing, 26, which may be packed with ice, or otherwise cooled, as shown at 27. The distributing pipe 23 passes through the casing, and the air passing through the pipes is thereby cooled before it reaches the various points of utilization in the system of distribution.

Fig. 5 shows the apparatus designed for an ordinary dwelling wherein the fresh air pipe, 19, extends preferably to the roof of the dwelling, from which location pure fresh air may be taken and passed down through the interior of the foul air pipe, 16, into the humidifying chamber, 20, and then into the fan chamber, 14, and thence to the distributing pipes 23, as shown and described with reference to Fig. 1.

In Fig. 4 is shown a duplex apparatus, one located at each end of the car, and the pipes of the respective apparatus confined to one side of the car. It will be apparent to persons skilled in the art that one apparatus could be made to answer the purpose as well, and that the duplicate pipes may be extended to both parts of the car if desired. The duplicate apparatus, however, is more easily installed and occupies less valuable space than would be necessary for the accommodation of the single apparatus.

One of the advantages of my system is that it provides at each end of the car a means for regulating the quantity, quality, and temperature of the air in a given compartment or berth, quite independent of the condition which may prevail in the adjoining berth of the car. Other advantages are that the air is effectively cleaned of dust and other objectionable matter before being distributed to the sleeping berths.

Having described my invention, what I claim is:

1. In a device of the character described, a fan, for producing an air current, a casing and piping connections including an inlet and an exhaust portion through which said current is adapted to pass, said casing providing a water chamber into the top of which the air passes from said inlet portion, said exhaust portion passing through said water chamber below the water level therein, whereby said water may be warmed by the relatively warm escaping air.

2. In a device of the character described, a fan, a fan wheel for producing an air current, a casing, and piping connections including an inlet and an exhaust portion through which said current is adapted to pass, one portion of said piping connections running within and encompassed by the other portion whereby the air between said coacting portions and the air within the inner portion may tend to become equal in temperature; said casing providing a water chamber into which the air from one said portion of the piping connections is drawn by said fan, the other portion passing through the water contained in said water chamber whereby the air therein may lend some of its heat to the water.

In testimony whereof I hereunto set my hand in the presence of two witnesses.

FRANK P. MIES.

In the presence of—
  Geo. T. May, Jr.,
  Mary F. Allen.